(12) United States Patent
Rosenfield et al.

(10) Patent No.: US 8,042,406 B2
(45) Date of Patent: Oct. 25, 2011

(54) METHOD OF DETERMINING OVERSPEED RELIABILITY

(75) Inventors: Ron Harvey Rosenfield, San Diego, CA (US); Shiv C. Gupta, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 231 days.

(21) Appl. No.: 12/485,218

(22) Filed: Jun. 16, 2009

(65) Prior Publication Data

US 2010/0313669 A1    Dec. 16, 2010

(51) Int. Cl.
*G01M 5/00* (2006.01)
(52) U.S. Cl. ............................................. 73/802; 73/760
(58) Field of Classification Search ............... 73/760, 73/802, 808
See application file for complete search history.

(56) References Cited

U.S. PATENT DOCUMENTS

| | | | |
|---|---|---|---|
| 5,594,178 A * | 1/1997 | Takahashi et al. ............... 73/808 |
| 6,122,575 A | 9/2000 | Schmidt et al. | |
| 6,209,390 B1 * | 4/2001 | LaRue et al. ............... 73/112.01 |
| 6,224,321 B1 | 5/2001 | Ebden et al. | |
| 6,226,597 B1 | 5/2001 | Eastman et al. | |
| 6,777,822 B1 | 8/2004 | Suttie et al. | |
| 6,889,577 B2 | 5/2005 | Griswold et al. | |
| 7,104,120 B2 * | 9/2006 | Gladden ..................... 73/114.77 |
| 7,194,865 B2 | 3/2007 | Drob | |
| 7,367,193 B1 | 5/2008 | Thompson | |
| 7,873,581 B2 * | 1/2011 | Flickinger et al. ................. 706/7 |

OTHER PUBLICATIONS

Predicting Warranty Returns Based on Customer Usage Data, ReliaSoft, (2002) http://www.reliasoft.com/newsletter/1q2002/usage.htm.*
Mecahnical Reliability, 1985 http://www.mtbf.us/PSIExamples/MechanicalReliabilityPrediction/MechanicalReliability.pdf.*
Toksoy, John, "Stress Strength Interference, Over Design Costs Money, Variation is the Enemy!" article, Load and Strength Interference Seminar, pp. 1-28, Nov. 7, 2002.

* cited by examiner

*Primary Examiner* — Max Noori
(74) *Attorney, Agent, or Firm* — Carlson, Gaskey & Olds, PC

(57) ABSTRACT

A method and system for determining the reliability of a rotating component compares a normalized stress curve with a normalized strength curve. The resulting overlap corresponds with the reliability of the rotating component.

8 Claims, 4 Drawing Sheets

| PARAMETER | | PROBABILITY FOR STANDARD DEVIATION | | | | | | | | |
|---|---|---|---|---|---|---|---|---|---|---|
| | | 1.0% | 2.0% | 3.0% | 4.0% | 5.0% | 6.0% | 7.0% | 8.0% | 9.0% |
| STANDARD DEVIATION (% OF MEAN STRENGTH) | PERCENTAGE OF MAX. OPERATING ROTOR SPEED | | | | | | | | | |
| MEAN STRENGTH # | 130.0% | 1.0E-02 | 1.0E-02 | 1.0E-02 | 1.0E-02 | 1.0E-02 | 1.0E-02 | 1.0E-02 | 1.0E-02 | 1.0E-02 |
| | 127.5% | 7.4E-10 | 1.7E-05 | 2.3E-04 | 7.1E-04 | 1.4E-03 | 2.0E-03 | 2.7E-03 | 3.3E-03 | 3.9E-03 |
| | 125.0% | 1.6E-22 | 1.6E-09 | 1.5E-06 | 2.7E-05 | 1.3E-04 | 3.3E-04 | 6.2E-04 | 9.9E-04 | 1.4E-03 |
| | 122.5% | 1.7E-40 | 8.7E-15 | 3.3E-09 | 5.7E-07 | 8.3E-06 | 4.2E-05 | 1.2E-04 | 2.6E-04 | 4.7E-04 |
| | 120.0% | 1.9E-63 | 3.4E-21 | 2.4E-12 | 6.7E-09 | 3.9E-07 | 4.3E-06 | 2.1E-05 | 6.4E-05 | 1.4E-04 |
| | 117.5% | 4.3E-91 | 1.1E-28 | 6.1E-16 | 4.7E-11 | 1.E3-08 | 3.7E-07 | 3.2E-06 | 1.4E-05 | 4.2E-05 |
| | 115.0% | 4.3-123 | 3.2E-37 | 6.0E-20 | 2.0E-13 | 3.4E-10 | 2.6E-08 | 4.2E-07 | 2.8E-06 | 1.1E-05 |
| | 112.5% | 3.9E-159 | 1.1E-46 | 2.4E-24 | 5.3E-16 | 6.7E-12 | 1.5E-09 | 4.9E-08 | 5.3E-07 | 2.9E-06 |
| | 110.0% | 6.4E-199 | 5.4E-57 | 4.3E-29 | 9.3E-19 | 1.0E-13 | 7.8E-11 | 5.2E-09 | 9.2E-08 | 7.1E-07 |
| | 109.0% | 8.2E-216 | 2.4E-61 | 4.4E-31 | 6.5E-20 | 1.8E-14 | 2.3E-11 | 2.1E-09 | 4.5E-08 | 4.0E-07 |
| | 108.0% | 3.1E-233 | 7.9E-66 | 4.0E-33 | 4.3E-21 | 3.1E-15 | 6.5E-12 | 8.1E-10 | 2.1E-08 | 2.2E-07 |
| | 107.0% | 3.5E-251 | 2.0E-70 | 3.2E-35 | 2.7E-22 | 5.0E-16 | 1.8E-12 | 3.1E-10 | 4.5E-08 | 1.2E-07 |
| | 106.0% | 1.3E-269 | 3.9E-75 | 2.3E-37 | 1.6E-23 | 8.0E-17 | 4.9E-13 | 1.2E-10 | 2.1E-08 | 6.8E-08 |
| | 105.0% | 1.6E-288 | 5.8E-80 | 1.5E-39 | 9.1E-25 | 1.2E-17 | 1.3E-13 | 4.5E-11 | 2.3E-09 | 3.7E-08 |
| | 104.0% | 7.1E-308 | 6.9E-85 | 9.1E-42 | 4.9E-26 | 1.8E-18 | 3.5E-14 | 1.7E-11 | 1.1E-09 | 2.0E-08 |
| NO | 103.0% | 0.0E+00 | 6.4E-90 | 4.9E-44 | 2.5E-27 | 2.7E-19 | 9.0E-15 | 6.1E-12 | 4.9E-10 | 1.1E-08 |
| | 102.0% | 0.0E+00 | 4.8E-95 | 2.4E-46 | 1.2E-28 | 3.8E-20 | 2.3E-15 | 2.2E-12 | 2.2E-10 | 5.9E-09 |
| | 101.0% | 0.0E+00 | 2.9E-100 | 1.1E-48 | 5.6E-30 | 5.2E-21 | 5.7E-16 | 7.9E-13 | 1.0E-10 | 3.2E-09 |
| NORMAL OPERATION | 100.0% | 0.0E+00 | 1.4E-105 | 4.5E-51 | 2.5E-31 | 7.0E-22 | 1.4E-16 | 2.8E-13 | 4.6E-11 | 1.7E-09 |

FIG.2

METHOD OF DETERMINING OVERSPEED RELIABILITY

BACKGROUND OF THE INVENTION

The present invention is directed towards a method for determining a reliability and its associated inherent safety for a rotating component over a range of speeds.

In many machines having rotating components, such as aircraft, the speed of the rotation will have an affect on the resulting reliability of the rotating component such that at faster speeds the rotating component has a higher likelihood of failure. In order to address this issue, and to prevent in flight failures, the FAA has implemented flight safety substantiation regulations which require a manufacturer to demonstrate the reliability of a certain rotating component, before the rotating component can be approved for use.

One factor which can lead to damage of a rotating component, is if the rotating component is operating in an overspeed condition. All rotating components have a rated speed at which they are able to properly operate. Often, a rotating component will be capable of rotating at a faster speed than the rated speed without becoming damaged. When a rotating component rotates at a speed above a threshold percentage of the maximum rated speed, the rated speed the rotating component is described as operating in an overspeed condition. The threshold percentage is determined on a per application basis. By way of example a threshold speed for an auxiliary power unit may be set at 103% of the rated speed, and therefore any rotation speed above 103% would be considered to be an "overspeed" condition.

An uncontained burst 514 can result from a few known processes as illustrated in FIG. 7. The first process occurs when a component speed increases beyond the maximum rated speed without the occurrence of an automatic shutdown 502. The occurrence of both an overspeed condition and the component failure probability being exceeded 504 is indicated in the figure by way of an AND gate 516. When both conditions occur, an elevated energy fragment release 510 is likely. When an elevated energy fragment release 510 occurs it is possible for the fragment to break through any containment and impact on other components, resulting in an uncontained burst 514.

A second process which can result in an uncontained burst 514 occurs when there is a high energy fragment departure 506, potentially due to wear. If the high energy fragment departure 506 occurs at the same time as a containment part failure 508, as indicated by the AND gate 518, a high energy fragment release 512 results. Both the first process and the second process result in an uncontained burst 514, as the fragments from the burst have not been properly contained by a containment component. The occurrence of either an elevated energy fragment release 510 or a high energy fragment release 512 resulting in an uncontained burst 514 is indicated by an OR gate 520.

One factor in failure rates is the strength of the material from which the rotating component is constructed. Since the strength of a material is a factor in the rotating component reliability, the material strength is utilized in the reliability calculations. It is known in the art that the material strength will vary between a set range of strengths for any material used. While an average material strength can be used to determine a rotating component reliability value, a more accurate reliability value is obtained when the entire range of material strengths is considered.

Current methods and techniques in the art for demonstrating reliability of a rotating component additionally neglect to account for the affect of a varying speed on the reliability or the affects of varying material strengths, and instead determine a single static reliability value based on an average material strength and average speed. One affect of the failure to account for varying speeds is that the reliability issues associated with overspeed conditions are largely ignored in the current state of the art.

SUMMARY OF THE INVENTION

Disclosed is a method and system for determining a reliability of an aircraft rotating component. The reliability is determined by comparing a material strength range with an anticipated stress range for each speed within an anticipated range of speeds. A probabilistic reliability value, which is representative of an expected failure rate at that speed, is then determined using the two ranges. The system then outputs the reliability for each speed.

These and other features of the present invention can be best understood from the following specification and drawings, the following of which is a brief description.

BRIEF DESCRIPTION OF THE DRAWINGS

FIG. 2 is a sample reliability chart illustrating the affect of an increasing overspeed condition on a rotating component.

DETAILED DESCRIPTION OF THE PREFERRED EMBODIMENT

Figure 1:
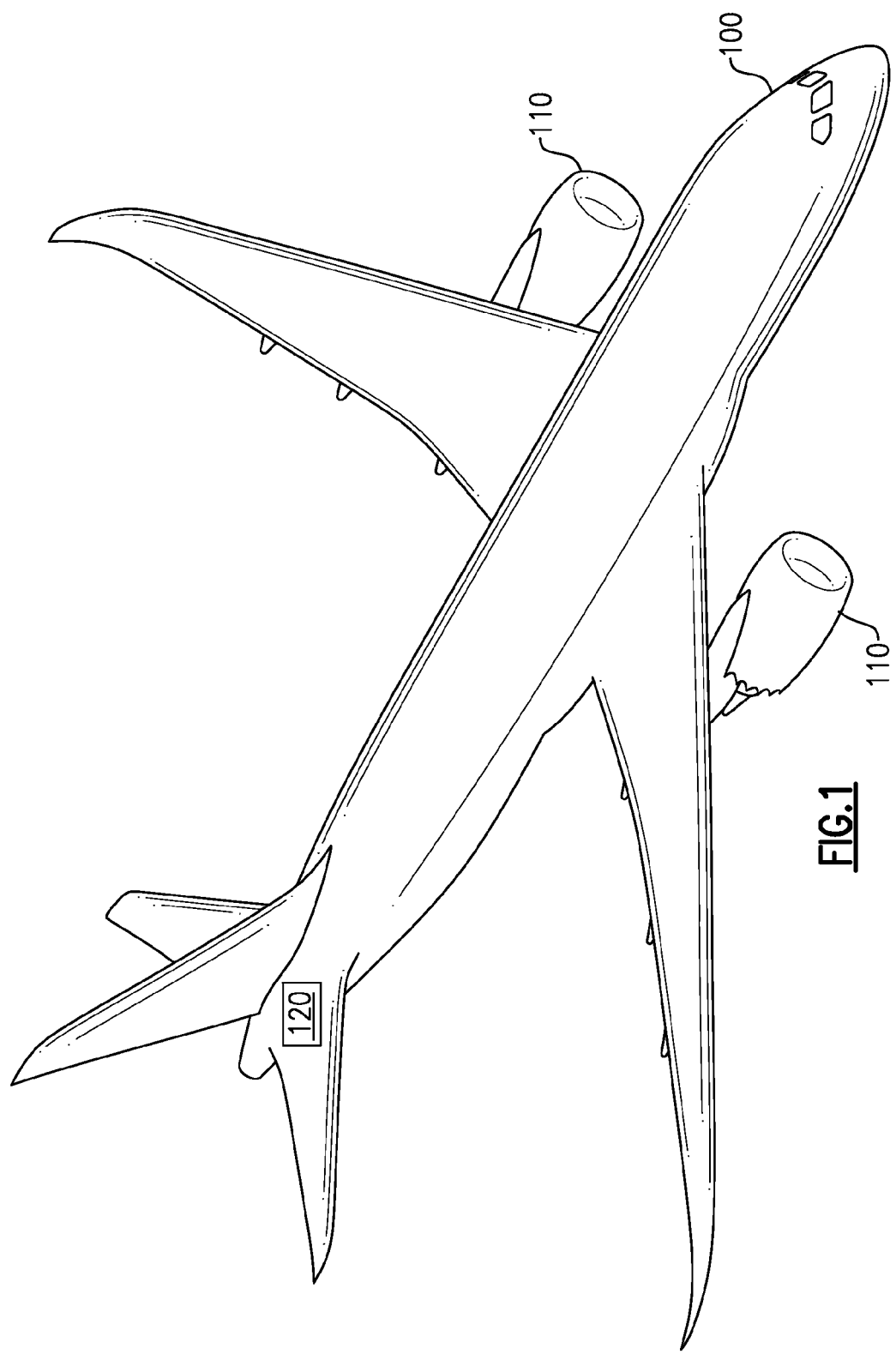
FIG. 1 schematically illustrates an airplane having an auxiliary power unit.

FIG. 1 illustrates an airplane 100 which utilizes gas turbine engines. Each of the gas turbine main engines 110 contain rotating components which rotate at a desired frequency. Since the gas turbine main engines 110 are mechanical and contain moving parts, stresses are applied to the rotating components. If the magnitude of the stress exceeds the strength of the material from which the rotating component is constructed, the rotating component can break. When a rotating component breaks, it has the potential to break in a manner which can damage the engine, thereby preventing that engine from properly operating until the engine has been repaired or replaced.

One related rotating component is an auxiliary power unit (APU) 120, which utilizes a rotating disc as a part of the APU's 120 construction. When the stresses on the disc exceed the strength of the material which is used to create the disc, the disc can burst. If the disc bursts in or near the disc's center, the bursting can release multiple large disc fragments into the engine, which can cause damage as the fragments are propelled outward. As a result of this potential for bursting, the FAA requires a demonstration of containment for any APU 120 or similar rotating component design before the rotating component can be certified for use. While the example of an APU 120 disc bursting is provided here, it is understood that the system and method can be applied to other rotating components and still fall within the claims.

While the current state of the art fails to account for the affect of overspeed conditions it has been discovered that overspeed conditions impact the reliability of a rotating component in a tangible way. FIG. 2 illustrates a table showing how the effect of an overspeed condition may impact a sample rotating component's reliability. Column 604 indicates the speed of the rotating component as a percentage of its maximum rated speed. Row 606 designates columns for the rotating component's material strength as a percentage of the mean strength of the material. By cross referencing a material strength value 606 with an operating speed 604, a reliability value can be found in the sample table. As can be seen by the exemplary data, the probability of a rotating component failure increases as an overspeed condition increases. At present the FAA requires a reliability of at least $1 \times 10^{-9}$ failures per million hours of component operation in order for a rotating component to be certified. Line 608 in the exemplary data set of FIG. 2 indicates a threshold line at which the example data crosses from meeting the FAA requirements (below the line 608) into not meeting the requirements (above line 608).

The reliability of a rotating component is necessarily dependent on both the strength of the material, from which it is composed and the stresses applied to the rotating component. Known engineering techniques can anticipate the range of stresses which will be applied to a rotating component at a given speed.

Figure 3:
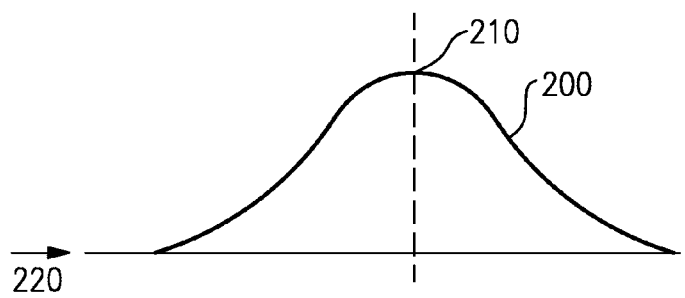
FIG. 3 illustrates a sample normalized material strength curve.

In order to demonstrate the reliability of the aircraft APU 120, a comparison is made between the strength of the material and the anticipated stresses resulting from the APU's rotation. FIG. 3 illustrates an example shape of a normalized strength curve 200 of a material strength range. When manufacturing any material or rotating component, it is known that the material will contain natural variations caused by outside factors which will result in a varying strength profile of the material. Strength ranges for many materials are known in the art, and can be determined empirically for materials which do not have an established strength profile. Once a range of strengths is determined for a material, the range can be applied to a normalized bell curve resulting in a normalized strength curve 200, as shown in FIG. 3, which can be used in the below described method. In the normalized strength curve 200, the mean strength 210 is located at the center line of the curve. According to known statistical principles, the area underneath a range of values on the strength axis 220 is the probability that a value will fall within the range of values. The total area under a normalized curve is always equal to 1.

Figure 4:
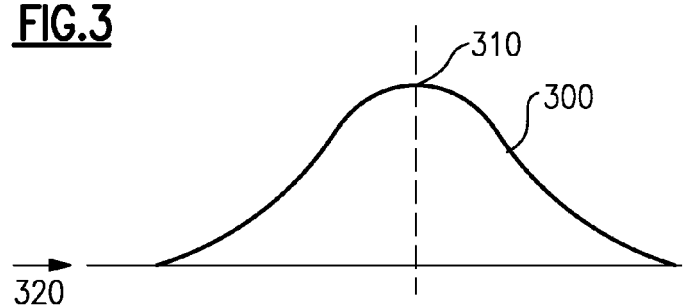
FIG. 4 illustrates a sample normalized anticipated stress curve.

FIG. 4 illustrates a normalized stress curve 300 of an anticipated stress range at a certain speed. The mean stress 310 is the center of the normalized stress curve 300. In the same manner as FIG. 3, the area under a range of stresses on a stress axis 320 is the probability of the stresses falling within that range. Theoretically, the stress is only influenced by the speed of the rotating disc, and therefore the stress is a direct function of the square of speed. It is known that outside forces such as turbulence, varying atmospheres, and varying temperatures can affect the amount of stress on the rotating component at any given speed. Consequently a given speed will have a range of stresses which can be fit to the normalized strength curve 300 in the same manner as the range of material strengths described above. An individual anticipated stress curve is determined for each of the potential speeds, including overspeed conditions using known engineering principles.

Figure 5:
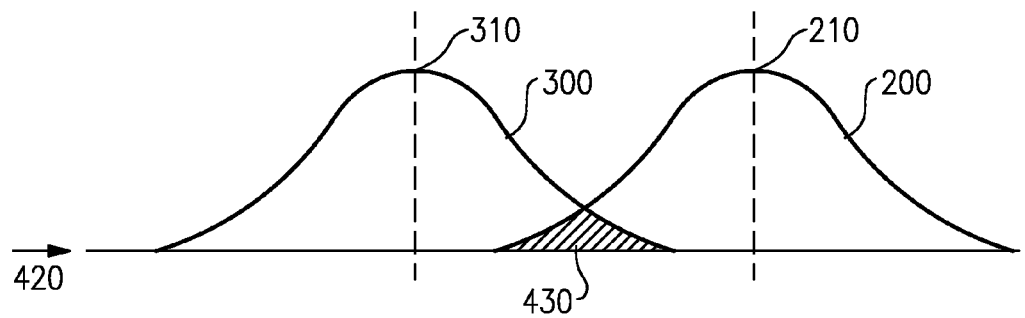
FIG. 5 illustrates a combination of a normalized strength curve and a normalized stress curve.

Once the material strength curve 200 (FIG. 3) and the anticipated stress curves 300 (FIG. 4) are determined, a statistical comparison can be made to determine a reliability factor. In performing this determination the stress axis 320 and the strength axis 220 are combined into a single load axis 420. An example of the resulting graph is illustrated in FIG. 5. The force axis 420 represents the load exerted by a stress for the stress curve 300 and the load which the rotating component can withstand for the strength curve 200.

Figure 6:
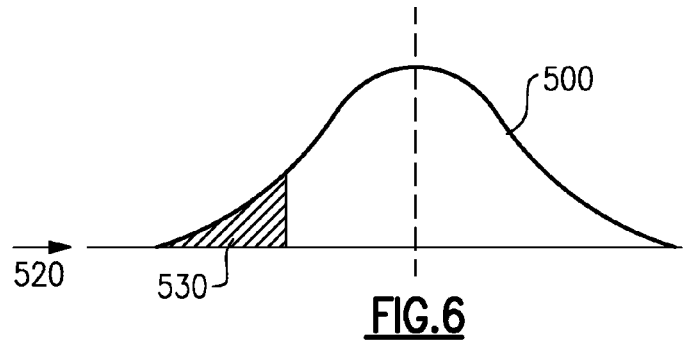
FIG. 6 illustrates an example strength—stress curve.
Figure 7:
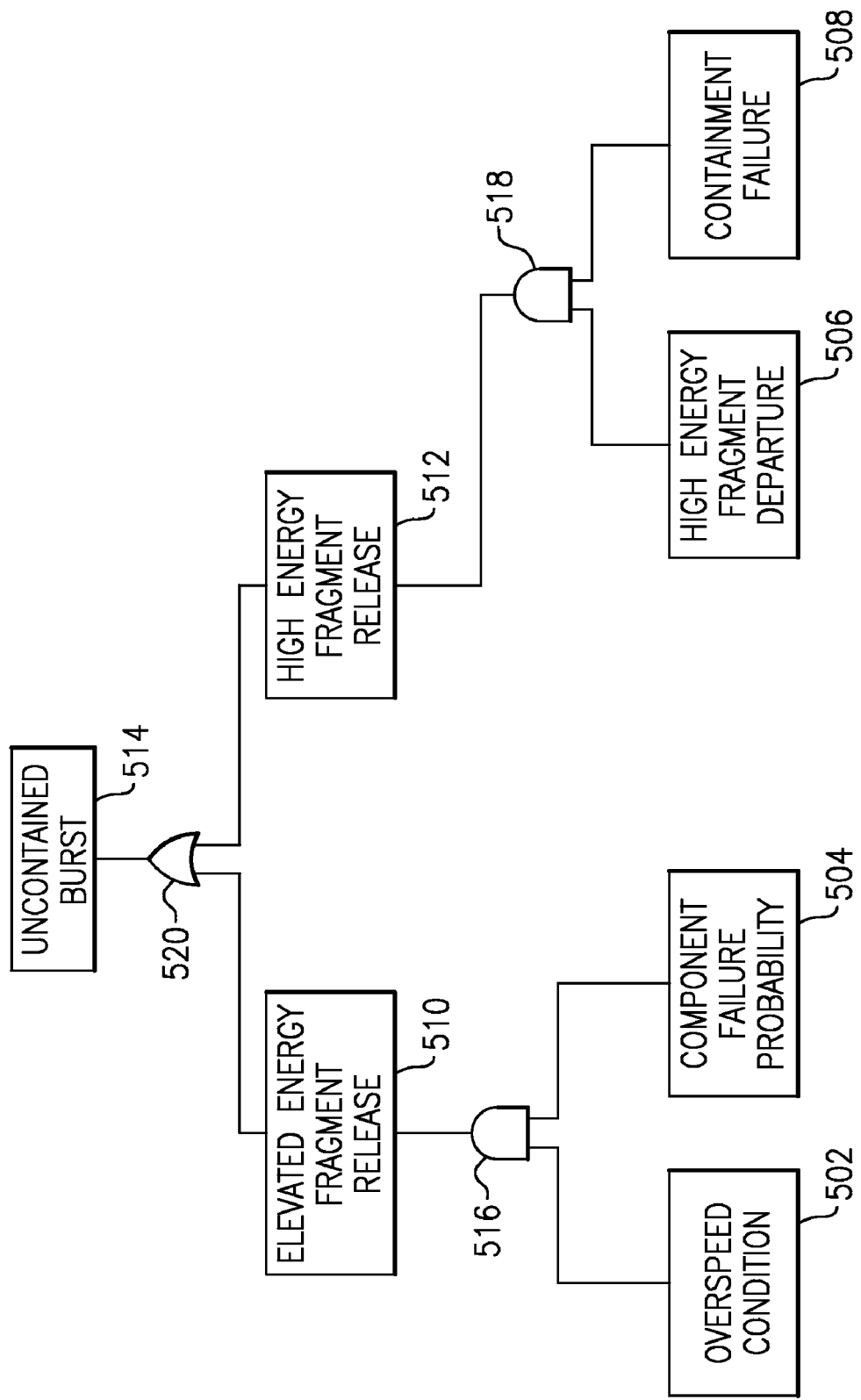
FIG. 7 illustrates an exemplary fault tree failure path through which a rotating component can progress to an uncontained burst.

By determining an intersection 430 of the two curves, that is, determining where the strength is exceeded by the stress, it is possible to create a strength—stress curve 500. Such a curve is illustrated in FIG. 6. The strength—stress curve 500 shows a distribution of interference which represents the numerical value of the strength of the material minus the anticipated stress exerted on the material on a load axis 520. The shaded area 530 of the strength—stress curve 500 represents the area where the strength of the rotating component is exceeded by the stress on the rotating component. When the area of the shaded area 530 is divided by the total area under the strength-stress curve 500, a percentage is determined. The percentage value is equal to an expected failure rate of a rotating component at a given speed. The failure percentage value can then be used for the creation of control systems, safety substantiation with the FAA, or for any other desired purpose.

This process can then be continued by creating a new stress curve for each anticipated speed, including speeds greater than the rated speed of the rotating component. The comparison steps are then repeated resulting in a reliability value for the rotating component at each speed, including potential speeds over the rated speed of the rotating component. These values can then be used to determine an overall reliability value of the rotating component using known techniques. The values determined according to this method factor in speed ranges, variable rotating component strengths, and outside effects on stress for each speed. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of determining a reliability of a rotating component comprising the steps of:
    accepting an input of strength range of a material;
    accepting an input of an anticipated stress range for a given rotational speed;
    determining an intersection of said material strength range and said anticipated stress range for each rotational speed in a range of rotational speeds;
    converting said intersection into a probabilistic rotating component reliability value for each speed in said range of rotational speeds; and
    outputing said rotating component reliability value via an output peripheral.

2. The method of claim 1, comprising the additional step of repeating said step of accepting an input of an anticipated stress range for a given rotational speed for said range of rotational speeds.

3. The method of claim 1, wherein said strength range comprises a set of the minimum expected strength to the maximum expected strength of the material.

4. The method of claim 1, wherein said rotating component is at least partially constructed from said material.

5. The method of claim 1, wherein said rotating component is an auxiliary power unit.

6. The method of claim 1, wherein said material strength range and said anticipated stress ranges comprise normal curve distributions.

7. The method of claim 1, further comprising the step of applying a normalization to all of said strength ranges and said anticipated stress ranges prior to said step of determining an intersection of said material strength range and said anticipated stress range for each rotational speed in said range of rotational speeds.

8. A system for determining a rotating component reliability comprising:
- a user interface for accepting a data set comprising a strength range, a speed range, and an anticipated stress range for at least a portion of speeds in said speed range;
- a computer readable medium storing instructions for performing the steps of:
  - accepting an input of strength range of a material;
  - accepting an input of an anticipated stress range for a given rotational speed;
  - repeating said step of accepting an input of an anticipated stress range for a given rotational speed for a range of rotational speeds;
  - determining an intersection of said material strength range and said anticipated stress range for each rotational speed in said range of rotational speeds;
  - converting said intersection into a probabilistic rotating component reliability value for each rotational speed in said range of rotational speeds;
  - outputting said rotating component reliability value via an output peripheral; and
- an output peripheral capable of outputting data resulting from said step of converting said intersection into a probabilistic rotating component reliability value for each rotational speed in said range of rotational speeds.

* * * * *